(12) United States Patent
Nakamura et al.

(10) Patent No.: US 9,050,243 B2
(45) Date of Patent: Jun. 9, 2015

(54) MULTILAYERED BODY FOR MEDICAL CONTAINERS AND MEDICAL CONTAINER

(75) Inventors: Manabu Nakamura, Yokohama (JP); Hiroshi Miyagi, Ichihara (JP)

(73) Assignee: HOSOKAWA YOKO CO., LTD., Tokyo (JP)

( * ) Notice: Subject to any disclaimer, the term of this patent is extended or adjusted under 35 U.S.C. 154(b) by 1035 days.

(21) Appl. No.: 12/809,005

(22) PCT Filed: Dec. 20, 2007

(86) PCT No.: PCT/JP2007/074554
§ 371 (c)(1),
(2), (4) Date: Jun. 17, 2010

(87) PCT Pub. No.: WO2009/081462
PCT Pub. Date: Jul. 2, 2009

(65) Prior Publication Data
US 2010/0276321 A1 Nov. 4, 2010

(51) Int. Cl.
*B32B 1/02* (2006.01)
*A61J 1/10* (2006.01)
*B32B 27/08* (2006.01)
*B32B 27/32* (2006.01)
*B32B 1/08* (2006.01)
*A61J 1/20* (2006.01)

(52) U.S. Cl.
CPC . *A61J 1/10* (2013.01); *A61J 1/2093* (2013.01); *B32B 27/08* (2013.01); *B32B 27/32* (2013.01); *B32B 27/325* (2013.01); *B32B 27/327* (2013.01); *B32B 2307/306* (2013.01); *B32B 2307/308* (2013.01); *B32B 2307/412* (2013.01); *B32B 2307/72* (2013.01); *B32B 2307/744* (2013.01); *B32B 2439/80* (2013.01)

(58) Field of Classification Search
USPC ............ 428/34.1, 34.2, 35.7, 35.9, 36.9
See application file for complete search history.

(56) References Cited

U.S. PATENT DOCUMENTS

| | | | | |
|---|---|---|---|---|
| 5,846,620 A * | 12/1998 | Compton | ............ | 428/35.7 |
| 7,619,038 B2 * | 11/2009 | Mehta et al. | ............ | 525/191 |
| 7,781,035 B2 * | 8/2010 | Jimbo et al. | ............ | 428/35.7 |
| 7,951,873 B2 * | 5/2011 | Best et al. | ............ | 525/191 |

(Continued)

FOREIGN PATENT DOCUMENTS

| | | |
|---|---|---|
| CN | 1642716 A | 7/2005 |
| CN | 1781473 A | 6/2006 |

(Continued)

OTHER PUBLICATIONS

Chinese Office Action, dated May 15, 2012, issued in corresponding Chinese Application No. 200780102018.0.

(Continued)

*Primary Examiner* — Marc Patterson
(74) *Attorney, Agent, or Firm* — Sughrue Mion, PLLC

(57) ABSTRACT

The present invention provides a multilayered body for medical containers, in which the innermost layer formed from a cyclic polyolefin exhibits favorable adhesion to another layer without using an adhesive, which exhibits excellent heat resistance, and which provides favorable blocking resistance when formed as a film, as well as a medical container formed from this multilayered body for medical containers, which suffers minimal deterioration in properties such as transparency and peel strength even when subjected to sterilization with high-pressure steam or the like.

19 Claims, 4 Drawing Sheets

(56) References Cited

U.S. PATENT DOCUMENTS

| | | |
|---|---|---|
| 2005/0221034 A1 | 10/2005 | Iwasaki et al. |
| 2006/0165928 A1 | 7/2006 | Suzuki et al. |
| 2006/0183860 A1* | 8/2006 | Mehta et al. .................. 525/191 |

FOREIGN PATENT DOCUMENTS

| | | | |
|---|---|---|---|
| EP | 0 920 989 | A2 | 6/1999 |
| JP | 2000-014747 | A | 1/2000 |
| JP | 2001-046473 | A | 2/2001 |
| JP | 3227709 | B2 | 11/2001 |
| JP | 2002-301796 | A | 10/2002 |
| JP | 2003-024415 | A | 1/2003 |
| JP | 2003-182744 | A | 7/2003 |
| JP | 2003-237002 | A | 8/2003 |
| JP | 2003-266601 | A | 9/2003 |
| JP | 2004-000476 | A | 1/2004 |
| JP | 2004-106514 | A | 4/2004 |
| JP | 2004-167800 | A | 6/2004 |
| JP | 2005-170455 | A | 6/2005 |
| JP | 2005-254508 | A | 9/2005 |
| JP | 2005-335108 | A | 12/2005 |
| JP | 2006-117279 | A | 5/2006 |
| JP | 2007-099767 | A | 4/2007 |
| JP | 2008-018063 | A | 1/2008 |
| RU | 2 248 885 | C2 | 3/2005 |
| WO | 03/097355 | A1 | 11/2003 |
| WO | 2004/080370 | A1 | 9/2004 |

OTHER PUBLICATIONS

Extended European Search Report dated Feb. 17, 2012 issued by the European Patent Office in counterpart European Patent Application No. 07859902.4.

Database WPI Week 200448 Thomson Scientific, London, GB; AN 2004-501915, XP-002669278.

Database WPI Week 200014 Thomson Scientific, London, GB; AN 2000-154675, XP-002669277.

Database WPI Week 200362 Thomson Scientific, London, GB; AN 2003-650513, XP-002669279.

Japanese Office Action issued in Japanese Application No. 2006-192900 dated Mar. 22, 2011.

Taiwanese Office Action issued in Application No. 096149769 dated Apr. 6, 2011.

Japanese Office Action dated Jun. 4, 2013 for corresponding Application No. 2011-114958.

Packaging Technique Handbook, Japan Packaging Institute, 1995, p. 437-441.

Packaging Technique Handbook, Japan Packaging Institute, 1995, p. 404-409.

"Plastic Dokuhon", Plastics Age Co., Ltd., Japan, 19th Edition, May 20, 2002, p. 135-139.

Russian Notice of Allowance issued in Application No. 2010129243 dated Nov. 11, 2011.

* cited by examiner

FIG. 3A
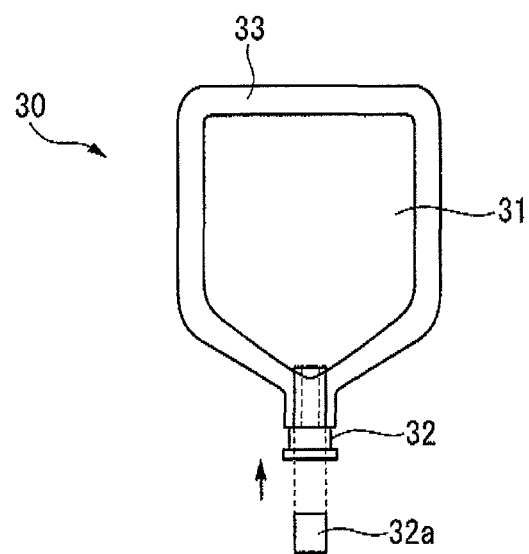
FIG. 3B
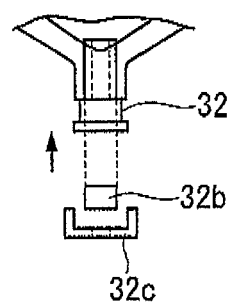
FIG. 4A          FIG. 4B
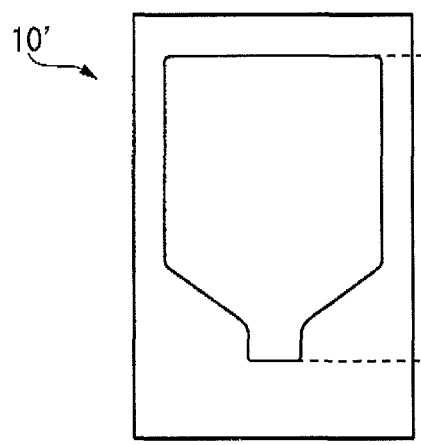 

MULTILAYERED BODY FOR MEDICAL CONTAINERS AND MEDICAL CONTAINER

TECHNICAL FIELD

The present invention relates to a multilayered body for medical containers, and a medical container having a holding portion for a medical fluid formed from the multilayered body for medical containers.

BACKGROUND ART

Examples of medical containers formed from resins that are used in the medical field include ampules, vials, syringes, and infusion bags made from films. Further, examples of these resins include polyolefins such as polyethylene and polypropylene, as well as styrene-based elastomers, vinyl chloride resins, ethylene-vinyl acetate copolymers and cyclic polyolefins.

Of these resins, polyethylene exhibits excellent sanitary properties, is flexible, and generates no toxic gases when incinerated, and is consequently widely used for medical containers. However, if polyethylene is used for the portion within the medical container that makes contact with the medical fluid, then it is known that the polyethylene within the medical fluid can adsorb certain medications such as lipophilic vitamins, resulting in a reduction in the concentration of those medications during storage.

As a result, cyclic polyolefins, which are capable of suppressing any reduction in the titer of a specific medication caused by adsorption or absorption of that medication, exhibit excellent properties of transparency, heat resistance and sanitation, and also provide superior barrier properties including a low water vapor transmission rate, are becoming increasingly widely used as a material for medical containers. One example of a medical container that uses a cyclic polyolefin is a pre-filled syringe, in which the syringe chamber is filled in advance with a medication, and such pre-filled syringes are becoming widespread.

Further, Patent Document 1 discloses a medical container having a multilayered structure in which a cyclic polyolefin layer formed from a thermoplastic saturated norbornene-based polymer is combined with a synthetic resin layer and/or a barrier layer or the like.

Patent Document 2 discloses a medical container formed from a multilayered film having a surface layer, a flexible layer, a barrier layer and a sealing layer, wherein a cyclic polyolefin and an ethylene-α-olefin copolymer are used for the barrier layer, and an ethylene-α-olefin copolymer is used as the main component of the other layers.

Patent Document 3 discloses a laminated film in which a layer B composed of a linear low-density polyethylene having a specific melting point and Vicat softening point is laminated to either one surface or both surfaces of a layer A composed of a resin such as a cyclic polyolefin, and also discloses a medical container that uses this laminated film.

Moreover, Patent Document 4 discloses a medical container that uses a laminated film prepared by laminating a sealant layer containing a cyclic polyolefin-based resin with a specific glass transition temperature as the main component to a substrate layer containing a polyolefin-based resin with a specific melting point as the main component.

[Patent Document 1]
Japanese Patent (Granted) Publication No. 3,227,709
[Patent Document 2]
International Patent Publication 03/097355 pamphlet
[Patent Document 3]
Japanese Unexamined Patent Application, First Publication No. 2004-167800
[Patent Document 4]
Japanese Unexamined Patent Application, First Publication No. 2005-254508

DISCLOSURE OF INVENTION

Problems to be Solved by the Invention

However, as disclosed in paragraph 0027 of Patent Document 1 and paragraph 0004 of Patent Document 2, cyclic polyolefins suffer from poor adhesiveness. Accordingly, during production of the multilayered film described in Patent Document 1, the conditions require that an adhesive must be used when laminating the cyclic polyolefin layer to the other layers. However, in a multilayered film that uses an adhesive, there is a possibility that components derived from the adhesive may bleed out of the film. Consequently, the use of this type of multilayered film in medical containers, and particularly for the inside layers that are close to the medical fluid, is undesirable from a sanitation perspective.

In the technology disclosed in Patent Document 2, the cyclic polyolefin is mixed with an ethylene-α-olefin copolymer to improve the adhesiveness of the cyclic polyolefin and this mixture is used to form the bather layer. However, this mixing with an ethylene-α-olefin copolymer causes a deterioration in the barrier properties of the barrier layer, and there is a possibility that the medication may be absorbed right through to the layer adjacent to the bather layer. Further, if the barrier layer is thickened in an attempt to improve the bather properties, then a problem arises in that the increased thickness causes an associated loss in flexibility.

Further, the heat resistance of the medical containers disclosed in Patent Documents 3 and 4 is inadequate, and these materials are unsuitable for medical containers that require sterilization treatment using high-pressure steam or the like. Furthermore, the laminated films disclosed in Patent Documents 3 and 4 also tend to suffer from inferior blocking resistance.

The present invention has been developed in light of the circumstances described above, and has an object of providing a multilayered body for medical containers, in which an innermost layer formed from a cyclic polyolefin exhibits favorable adhesion to another layer without using an adhesive, which exhibits excellent heat resistance, and which provides favorable blocking resistance when formed as a film, as well as providing a medical container formed from this multilayered body for medical containers, which suffers minimal deterioration in properties such as transparency and peel strength even when subjected to sterilization with high-pressure steam or the like.

Means to Solve the Problems

A multilayered body for medical containers according to the present invention is used in forming a medical container, and includes at least an innermost layer composed of a cyclic polyolefin, an intermediate layer which is formed adjacently to the innermost layer and contains, as the main component, a linear low-density polyethylene produced using a single-site catalyst, and an outermost layer that contains a high-density polyethylene.

The cyclic polyolefin is preferably a hydrogenated product of a ring-opening polymer of a cyclic olefin monomer.

The density of the linear low-density polyethylene is preferably not less than 0.860 g/cm³ but less than 0.940 g/cm³.

The density of the high-density polyethylene is preferably within a range from 0.940 to 0.970 g/cm³.

The outermost layer is preferably either a mixture of the high-density polyethylene and a high-pressure low-density polyethylene, or composed solely of the high-density polyethylene.

The multilayered body for medical containers according to the present invention preferably has a total thickness within a range from 60 to 1,000 μm, composed of three layers of the innermost layer with a thickness of 5 to 100 μm, the intermediate layer, and the outermost layer with a thickness of 5 to 100 μm.

A medical container according to the present invention includes a holding portion for holding a medical fluid, wherein at least the holding portion is formed from the aforementioned multilayered body for medical containers.

In this case, the multilayered body for medical containers may be a blow-molded body. Further, the multilayered body for medical containers may be a film, and the holding portion may be prepared by hot-plate molding of the film, or may be formed in the shape of a bag.

Effect of the Invention

The present invention is able to provide a multilayered body for medical containers, in which an innermost layer formed from a cyclic polyolefin exhibits favorable adhesion to another layer without using an adhesive, which exhibits excellent heat resistance, and which provides favorable blocking resistance when formed as a film, and also provide a medical container formed from this multilayered body for medical containers, which suffers minimal deterioration in properties such as transparency and peel strength even when subjected to sterilization with high-pressure steam or the like.

BRIEF DESCRIPTION OF THE DRAWINGS

FIG. 3(A) is a plan view illustrating another example of a medical container of the present invention, and FIG. 3(B) is a plan view illustrating another example of the port section.

FIG. 4(A) is a front view and FIG. 4(B) is a side view of a film molded article used in producing the medical container illustrated in FIG. 3.

DESCRIPTION OF THE REFERENCE SYMBOLS

Figure 1:
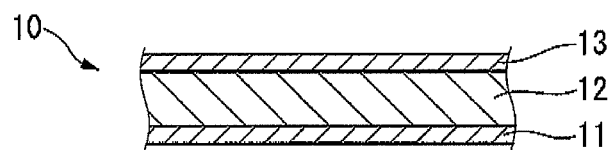
FIG. 1 is a cross-sectional view illustrating one example of a multilayered body of the present invention.

10 Multilayered body
11 Innermost layer
12 Intermediate layer
13 Outermost layer
20, 30, 40 Medical container
50 Multiple-chamber medical container

BEST MODE FOR CARRYING OUT THE INVENTION

A more detailed description of the present invention is presented below.

A multilayered body for medical containers according to the present invention is used in the formation of a medical container, and is particularly useful in forming the holding portion that holds a medical fluid within the medical container. The multilayered body includes at least an innermost layer composed of a cyclic polyolefin, an intermediate layer which is formed adjacently to the innermost layer and contains, as the main component, a linear low-density polyethylene produced using a single-site catalyst, and an outermost layer that contains a high-density polyethylene.

FIG. 1 is a diagram illustrating a multilayered body for medical containers (hereafter simply referred to as a "multilayered body") 10 that represents one example of the present invention.

The multilayered body 10 of this example is a three-layered structure prepared by laminating following order, an innermost layer 11 composed of a cyclic polyolefin, an intermediate layer 12 that contains, as the main component, a linear low-density polyethylene produced using a single-site catalyst, and an outermost layer 13 that contains a high-density polyethylene, and is formed as a film using an air-cooling or water-cooling multilayer inflation molding method, or a multilayer T-die molding method or the like. In the present invention, films and sheets are both referred to using the generic term "film".

The innermost layer 11 becomes the inside surface when a medical container is formed from the multilayered body 10, and therefore makes direct contact with the medical fluid contained inside the medical container. The innermost layer 11 is formed from a cyclic polyolefin.

Cyclic polyolefins exhibit minimal adsorption or absorption of medications, and by forming a medical container from the multilayered body 10 so that a layer composed of a cyclic polyolefin functions as the innermost layer 11, reductions in the titer of the medical fluid contained within the medical container can be suppressed. Further, cyclic polyolefins exhibit superior barrier properties including a low water vapor transmission rat; and also exhibit excellent sanitation, with extremely little elution of impurities, and these properties also make cyclic polyolefins ideal as the innermost layer 11. Moreover, cyclic polyolefins also have favorable heat resistance and transparency, and both these properties are ideal for use within medical containers, which must undergo sterilization using high-pressure steam or the like, and are preferably transparent so that the contents of the container can be confirmed visually from externally.

Examples of the cyclic polyolefin include ring-opening polymers of cyclic olefin monomers and hydrogenated products of such ring-opening polymers, addition polymers of cyclic olefin monomers, and addition copolymers of a cyclic olefin monomer and another monomer that is copolymerizable with the cyclic olefin monomer. Of these, a hydrogenated product of a ring-opening polymer of a cyclic olefin monomer is preferred in terms of the heat resistance and mechanical strength and the like. Further, in terms of obtaining a polymer having low adsorption properties, the use of a solely hydrocarbon cyclic olefin monomer is preferred.

Although there are no particular limitations on the cyclic olefin monomer, typical examples include norbornene-based monomers and monocyclic olefin monomers. A norbornene-based monomer is a monomer having a unit derived from a norbornene structure within the monomer structure, and specific examples include bicyclo[2.2.1]hept-2-ene (trivial name: norbornene), tricyclo[4.3.0.1$^{2,5}$]deca-3,7-diene (trivial name: dicyclopentadiene), 7,8-benzotricyclo [4.3.0.1$^{2,5}$]deca-3-ene (trivial name: methanotetrahydrofluorene), and tetracyclo[4.4.0.1$^{2,5}$.1$^{7,10}$]dodeca-3-ene (trivial name: tetracyclododecene). Further, these norbornene-based monomers may have a hydrocarbon group of 1 to 3 carbon atoms. Specific examples of the monocyclic olefin monomers include cyclohexene, cycloheptene and cyclooctene. These cyclic olefin monomers may be used individually, or two or more types of cyclic olefin monomers may be used in combination.

A ring-opening polymer of the cyclic olefin monomer is obtained by polymerizing the cyclic olefin monomer by a metathesis reaction in the presence of a known ring-opening polymerization catalyst. Further, a hydrogenated product of a ring-opening polymer of the cyclic olefin monomer is obtained by hydrogenating the ring-opening polymer using a known hydrogenation catalyst.

Example of other monomers that are capable of addition copolymerization with the cyclic olefin monomer include α-olefins of 2 to 20 carbon atoms such as ethylene, propylene, 1-butene and 1-hexene. Any of these α-olefins may be used individually, or two or more types of α-olefins may be used in combination. The addition (co)polymers of the cyclic olefin monomer can be obtained by performing a polymerization using a conventional catalyst composed of a titanium or zirconium compound and an organic aluminum compound.

Of the various cyclic polyolefins available commercially, examples of addition (co)polymers of cyclic olefin monomers include the products APEL (a registered trademark) manufactured by Mitsui Chemicals, Inc., and TOPAS (a registered trademark) manufactured by Ticona GmbH, whereas examples of hydrogenated products of ring-opening polymers of cyclic olefin monomers include the products ZEONOR (a registered trademark) and ZEONEX (a registered trademark) manufactured by Zeon Corporation.

The glass transition temperature (hereafter also abbreviated as Tg) of the cyclic polyolefin is preferably within a range from 70 to 180° C., and more preferably from 100 to 140° C. If the Tg is less than 70° C., then the heat resistance of a medical container formed from the multilayered body 10 tends to decrease, and the medical container may not be suitable for sterilization using high-pressure steam or the like. In contrast, if the Tg exceeds 140° C., then there is a possibility that the moldability and heat sealing properties of the multilayered body may deteriorate. In this description, the glass transition temperature refers to the value measured in accordance with JIS K 7121 using a differential scanning calorimeter (hereafter abbreviated as DSC), and is typically included in the catalogs and technical information provided by the manufacturer.

The Tg of the cyclic polyolefin can be adjusted arbitrarily using a method in which those cyclic polyolefins among a plurality of cyclic polyolefins that exhibit favorable compatibility are mixed together in an appropriate ratio. The level of compatibility of a mixture of cyclic polyolefins can be ascertained by using a DSC to measure the Tg of the mixture. In the case of a mixture of favorable compatibility, only a single Tg is observed, whereas in those cases where the compatibility is not particularly favorable, a plurality of Tg are observed. A mixture of favorable compatibility is preferred, as it is capable of offering a combination of a level of heat resistance capable of withstanding the targeted high-pressure steam sterilization temperature, and favorable moldability.

Although the innermost layer 11 is composed of a cyclic polyolefin, it may also include typical amounts of any of the additives generally used in the resins field, such as antistatic agents, antioxidants, lubricants, antifogging agents, ultraviolet absorbers and neutralizing agents, provided inclusion of these additives does not impair the effects of the present invention.

The intermediate layer 12 is formed adjacently to the innermost layer 11 described above, is produced using a single-site catalyst typified by a metallocene catalyst, and contains a linear low-density polyethylene (hereafter also abbreviated as LLDPE) with a density of not less than 0.860 g/cm$^3$ but less than 0.940 g/cm$^3$ as the main component. Here, the expression "main component" indicates an amount of at least 50% by weight.

This type of LLDPE produced using a single-site catalyst exhibits excellent adhesion to cyclic polyolefins, and suffers minimal deterioration in adhesiveness even when exposed to conditions of high temperature and high humidity during high-pressure steam sterilization. Accordingly, by providing this type of intermediate layer 12 containing an LLDPE as the main component adjacently to the innermost layer 11 composed of the cyclic polyolefin, other layers can be bonded in a favorable and stable manner via this intermediate layer 12. Further, an LLDPE produced using a single-site catalyst exhibits excellent transparency, and suffers minimal deterioration in this transparency even when exposed to conditions of high temperature and high humidity. For these reasons, a multilayered body 10 provided with this type of intermediate layer 12 is ideal for the formation of medical containers that require sterilization using high-pressure steam.

Any LLDPE product prepared using a single-site catalyst and having a density of not less than 0.860 g/cm$^3$ but less than 0.940 g/cm$^3$ can be used favorably, although of such products, the use of an LLDPE having a density within a range from 0.900 to 0.917 g/cm$^3$ is preferred, as it yields a multilayered body 10 and a medical container of superior heat resistance which suffer absolutely no problems even when sterilized using high-pressure steam at 121° C., and is also capable of suppressing any deterioration in the peel strength between the intermediate layer 12 and the innermost layer 11 when a medical container formed from the multilayered body 10 is subjected to sterilization with high-pressure steam. If the density of the LLDPE is less than 0.860 g/cm$^3$, then the heat resistance may deteriorate. In contrast, if the density of the LLDPE exceeds 0.940 g/cm$^3$, then the transparency and impact resistance of the container may deteriorate.

Furthermore, a plurality of LLDPEs having different densities may be used in combination as the LLDPE produced using a single-site catalyst.

Further, among the various LLDPE products produced using a single-site catalyst, those in which the composition distribution of the ethylene and the α-olefin, measured by composition analysis, is broad exhibit excellent workability and impact resistance, and are therefore preferred. Examples of commercially available products that exhibit these types of properties and can be used favorably include the products HARMOREX (a registered trademark) manufactured by Japan Polyethylene Corporation, UMERIT (a registered trademark) manufactured by Ube Industries, Ltd., and EVOLUE (a registered trademark) manufactured by Prime Polymer Co., Ltd.

The intermediate layer 12 contains an LLDPE produced using a single site catalyst as the main component, namely in an amount of at least 50% by weight, and from the viewpoint of achieving favorable flexibility, this amount is preferably at least 65% by weight, and more preferably 80% by weight or greater, although the intermediate layer 12 may also contain other polyethylenes or cyclic polyolefins, provided inclusion of these other compounds does not impair the adhesion to the innermost layer 11. In particular, if a high-density polyethylene having a density higher than that of the LLDPE produced using a single-site catalyst is used in combination with the LLDPE in an amount that is preferably not more than 30% by weight, and more preferably not more than 25% by weight, then the heat resistance can be improved, and any deterioration in the adhesiveness of the intermediate layer 12 caused by high-pressure steam sterilization can be suppressed. Further, combining the LLDPE with other polyethylenes or cyclic polyolefins in this manner offers another advantage in that a multilayered body 10 of superior external appearance can be obtained.

Further, the intermediate layer 12 may also include typical amounts of any of the additives generally used in the resins field, such as antistatic agents, antioxidants, lubricants, anti-fogging agents, ultraviolet absorbers and neutralizing agents, provided inclusion of these additives does not impair the effects of the present invention.

The outermost layer 13 becomes the most outside layer when a medical container is formed from the multilayered body 10, and contains a high-density polyethylene (hereafter also abbreviated as HDPE).

By providing a layer containing an HDPE as the outermost layer 13, the heat resistance of the resulting multilayered body 10 can be improved, and a medical container can be formed which suffers minimal deterioration in the properties of the medical container, such as deformation of the container, surface, upon sterilization with high-pressure steam. Further, in the case of a film-like multilayered body 10 such as the example illustrated in FIG. 1, the product is often wound up into a roll-like form for storage or handling, and providing a layer containing an HDPE as the outermost layer 13 ensures that the multilayered body 10 exhibits excellent blocking resistance.

Any HDPE product having a density within a range from 0.940 to 0.970 g/cm$^3$ can be used favorably, although of such HDPE products, using an HDPE having a density of 0.945 to 0.970 g/cm$^3$ enables a multilayered body 10 having superior levels of heat resistance and blocking resistance to be obtained. Further, a plurality of HDPEs having different densities may also be used in combination.

The ideal amount of the HDPE within the outermost layer 13 varies depending on the density of the HDPE, but for example, if the density of the HDPE is within a range from 0.945 to 0.970 g/cm$^3$, then ensuring that the ROPE content within the outermost layer 13 is at least 20% by weight enables the formation of a medical container with favorable heat resistance, which suffers minimal deterioration in the properties of the container even when sterilized using high-pressure steam at 121° C. However, in order to achieve a more stable level of heat resistance and superior blocking resistance, the HDPE content within the outermost layer 13 is preferably at least 30% by weight, more preferably 70% by weight or higher, and most preferably 100% by weight.

However, other resins may also be blended into the outermost layer 13 for the purpose of enhancing the molding stability, and in such cases, the HDPE content may be altered as appropriate. Examples of these other resins include polyolefins other than HDPE, and other polyethylene resins such as linear low-density polyethylene and high-pressure low-density polyethylene can be used particularly favorably. Of these, the use of a high-pressure low-density polyethylene in combination with the HDPE yields a more significant improvement in the molding stability of the outermost layer 13. The high-pressure low-density polyethylene preferably has a density within a range from 0.910 to 0.935 g/cm$^3$, and more preferably from 0.920 to 0.935 g/cm$^3$.

Further, the outermost layer 13 may also include typical amounts of any of the additives generally used in the resins field, such as antistatic agents, antioxidants, lubricants, anti-fogging agents, ultraviolet absorbers and neutralizing agents, provided inclusion of these additives does not impair the effects of the present invention. Furthermore, the outermost layer 13 may also be subjected to modification such as crosslinking using an electron beam in order to further improve the heat resistance.

Although there are no particular limitations on the total thickness of the multilayered body 10, the thickness is typically within a range from 60 to 1,000 µm, and if factors such as the flexibility and strength of the multilayered body 10 are taken into consideration, then the thickness is preferably within a range from 100 to 600 µm, and more preferably from 100 to 400 µm.

Although there are no particular limitations on the thickness of each layer, the thickness of the innermost layer 11 is preferably within a range from 5 to 100 µm, and the thickness of the outermost layer 13 is preferably within a range from 5 to 100 µm. If the thickness of the innermost layer 11 is less than 5 µm, then there is a possibility that the medication contained inside the container may be more readily adsorbed, whereas if the thickness exceeds 100 µm, then the flexibility of the multilayered body 10 and the heat sealing properties achievable when a medical container is formed from the multilayered body 10 may deteriorate. Further, if the thickness of the outermost layer 13 is less than 5 µm, then there is a possibility that the heat resistance of the multilayered body 10 may deteriorate, whereas if the thickness exceeds 100 µm, then the transparency may deteriorate.

Accordingly, in the case of a multilayered body 10 composed of three layers, the total thickness is preferably set to a value within a range from 60 to 1,000 the thickness of the innermost layer 11 is preferably set to 5 to 100 µm, and the thickness of the outermost layer is preferably set to 5 to 100 µm, with the remainder being the intermediate layer 12.

In those cases where the multilayered body 10 composed of three layers is a film, the thickness of the innermost layer 11 is preferably from 5 to 100 µm, the thickness of the intermediate layer 12 is preferably from 50 to 300 µm, and the thickness of the outermost layer is preferably from 5 to 100 µm.

As described above, the multilayered body 10 illustrated in FIG. 1 is composed of three layers in which the innermost layer 11 composed of a cyclic polyolefin and the outermost layer 13 containing an HDPE are bonded favorably together with the intermediate layer 12 disposed therebetween, and although this structure has satisfactory properties for use as a multilayered body 10 for a medical container, one or more additional layers may be provided between the intermediate layer 12 and the outermost layer 13, generating a multilayered body of four layers or more, in order to impart other additional properties to the structure. Examples of these additional layers include a gas barrier resin layer formed from an ethylene-vinyl alcohol copolymer or the like, an adhesive resin layer formed from an ethylene-vinyl acetate copolymer or the like, an ultraviolet blocking layer formed from an iron oxide-containing polyolefin resin or the like, or an oxygen absorbing layer formed from a cobalt salt and a polyamide resin such as an MXD nylon obtained from xylylenediamine and an α,ω-linear aliphatic dibasic acid such as adipic acid.

Further, the configuration of the multilayered body need not necessarily be a film-like multilayered body 10 such as that illustrated in FIG. 1, and as described in further detail below, may also adopt a three-dimensional shape of multilayered body such as a blow-molded body, which is molded using a multilayer blow molding method (multilayer hollow molding method).

A medical container of the present invention includes a holding portion for holding a medical fluid, wherein at least the holding portion is formed from the multilayered body described above. The multilayered body is disposed so that the innermost layer forms the inside surface of the holding portion, and the outermost layer forms the outside surface. Further, besides the holding portion, the medical container typically includes a port section that acts as the port for injecting and extracting a medical fluid.

Specific examples of the medical container of the present invention are described below with reference to the drawings.

Figure 2A:
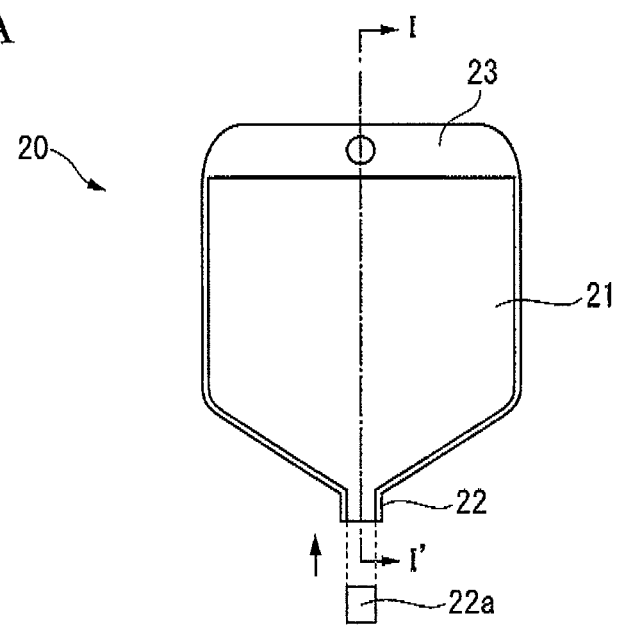
FIG. 2(A) is a plan view illustrating one example of a medical container of the present invention.
Figure 2B:
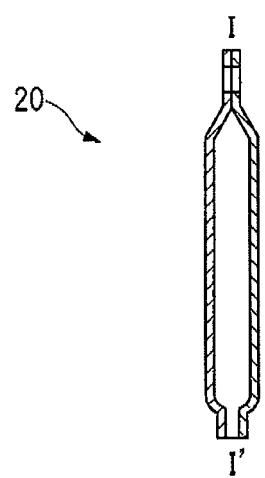
FIG. 2(B) is a cross-sectional view along the line I-I' in FIG. 2(A).

FIG. 2 represents a medical container 20 in which a holding portion 21 and a port section 22 are molded in an integrated manner by a multilayer blow molding method. The upper portion of this medical container 20 acts as a suspension portion 23 that has a suspension hole formed therein, whereas the lower port section 22 is sealed by insertion of a rubber plug 22a, which is prepared by using an injection molding method to provide a layer of a synthetic resin that can be welded to the innermost layer 11 around the outer periphery on the sides of a circular cylindrically shaped rubber material through which an injection needle is able to be thrust.

This medical container 20 can be produced by a typical multilayer blow molding method using a multilayer blow molding apparatus. In other words, a multilayer parison is extruded and then sandwiched within a molding die, and clean air is then blown into the multilayer parison. By using a molding die that is capable of molding the holding portion 21 and the port section 22 in an integrated manner, the medical container 20 illustrated in FIG. 2 can be formed from a hollow blow-molded body. Further, when sandwiching the multilayer parison within the molding die, by conducting a pre-blow in advance using clean air, and then, following closing of the molding die, placing the inside of the molding die under negative pressure using vacuum holes provided in the molding die, the transfer precision of the molding die can be improved.

Other possible methods for forming the port section, besides the multilayer blow molding method described above in which the port section is formed in an integrated manner with the holding portion, include methods such as that illustrated in FIG. 3 and described below, in which a separately prepared cylindrical member is affixed to the holding portion by heat sealing, and methods in which a cylindrical member is provided as an insert in an insert blow molding method, and integrated with the holding portion at the same time as the molding process. In those cases where this type of cylindrical member is used, then in addition to those configurations where a rubber plug 22a is inserted into the cylindrical member to seal the container, another possible configuration, which is described below in further detail with reference to FIG. 3(B), involves inserting a rubber plug into the cylindrical member, clamping the periphery of the rubber plug with a ring-shaped lid member, and then using ultrasound or the like to weld the lid member and the cylindrical member together.

FIG. 3(A) illustrates a medical container 30 formed from a holding portion 31 that has been formed by hot-plate molding of a film, and a port section 32, which is a cylindrical member that can be sealed by subjecting a rubber plug 32a to heat sealing. The holding portion 31 of this medical container 30 is formed by superimposing two film molded articles 10' illustrated in FIG. 4, and then heat sealing the peripheral portions 33 of those two molded articles.

In other words, when producing this medical container 30, first, a hot-plate molding method such as vacuum molding or air pressure molding is used to form film-like multilayered bodies 10 such as that illustrated in FIG. 1 having a concave depression in the central region of the film that matches the internal shape of the holding portion 31, thus yielding the types of film molded articles 10' illustrated in FIG. 4. Subsequently, having prepared two of these film molded articles 10', the items are superimposed with the concave depressions facing each other. Then, with the cylindrical member positioned in a predetermined location, the peripheral portions of the two film molded articles 10' are heat sealed. The heat sealing temperature varies depending on the total thickness of the multilayered body 10, and although there are no particular limitations, is preferably within a range from approximately 150 to 280° C. Further, following heat sealing, the peripheral portions may be trimmed if necessary. By employing this type of method, formation of the holding portion 31 and formation of the port section 32 by heat sealing of the cylindrical member occur simultaneously, enabling production of the medical container 30 illustrated in FIG. 3(A).

Formation of the holding portion 31 and formation of the port section 32 may also be performed in separate steps.

The material for the cylindrical member used in forming the port section 32 is preferably the same cyclic polyolefin as that used for the innermost layer 11 of the multilayered body 10, as this yields more favorable heat sealing with the holding portion 31. However, the material is not limited to a cyclic polyolefin, provided a liquid-tight heat seal can be achieved with the holding portion 31, and for example, LLDPE products produced using a single-site catalyst or materials having the same composition as the intermediate layer 12 may also be used. Further, a multilayered material that uses a heat sealable resin on the surface of the cylindrical member that is subjected to heat sealing may also be used. An alternative to forming the port section 32 from the cylindrical member and the rubber plug 32a is illustrated in FIG. 3(B), and involves inserting a rubber plug 32b into the cylindrical member, clamping the periphery of the rubber plug 32b with a ring-shaped lid member 32c, and then using ultrasound or the like to weld the lid member 32c and the cylindrical member together.

Figure 5:
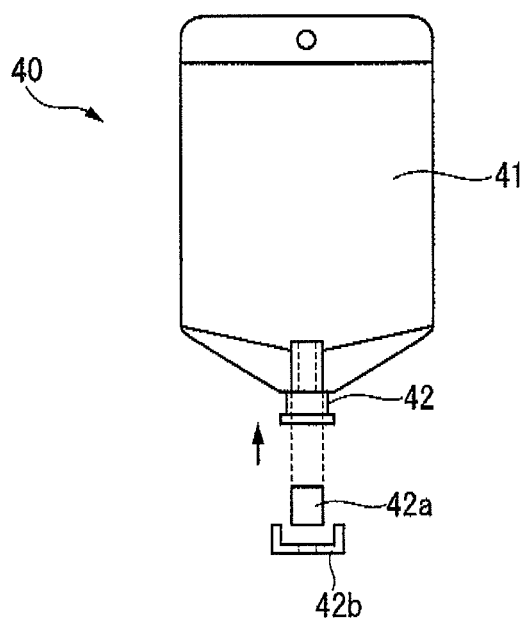
FIG. 5 is a plan view illustrating yet another example of a medical container of the present invention.

FIG. 5 illustrates a so-called film bag medical container 40 that includes a holding portion 41 composed of a film-like multilayered body 10 such as that illustrated in FIG. 1 formed in the shape of a bag, and a port section 42 formed from a cylindrical member.

The medical container 40 of this example uses a multilayered body that has been formed in a cylindrical shape by a multilayer inflation method or the like, and can be produced by heat sealing both end sections of the multilayered body to from a holding portion 41, heat sealing a cylindrical member at a predetermined location at one of the end sections to form a port section 42, and forming a suspension portion at the other end section. The heat sealing of the two end sections, and the heat sealing of the cylindrical member may be conducted either simultaneously or in separate steps. Further, instead of using the cylindrical multilayered body mentioned above, two multilayered bodies 10 such as those illustrated in FIG. 1 may be used, and in such a case, the two multilayered bodies are superimposed, and the peripheral portions are then heat sealed to form the holding portion.

Furthermore, the port section 42 in this example is sealed by a cylindrical member that is formed from a cyclic polyolefin or an LLDPE produced using a single-site catalyst, a rubber plug 42a through which an injection needle is able to be thrust, and a ring-shaped lid member 42b that clamps the periphery of the rubber plug 42a.

In the medical containers described above, at least the holding portion is formed from a multilayered body that includes an innermost layer composed of a cyclic polyolefin, an intermediate layer that contains, as the main component, a linear low-density polyethylene produced using a single-site catalyst, and an outermost layer that contains a high-density polyethylene, and therefore each of the layers bond together favorably, and the medical container has favorable sanitation properties and excellent heat resistance, and suffers minimal deterioration in properties such as the transparency and peel strength even when sterilized using high-pressure steam.

Figure 6:
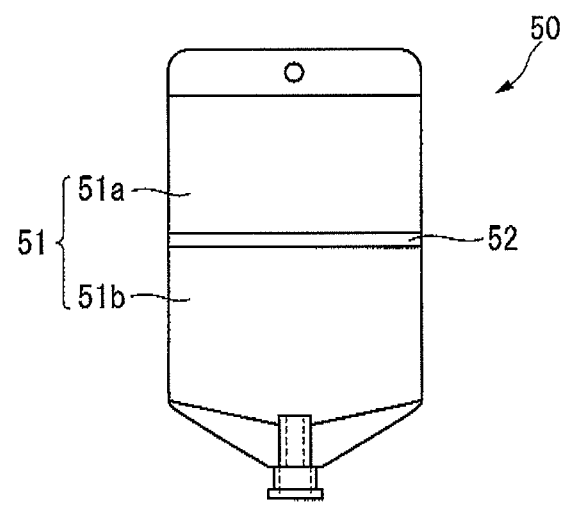
FIG. 6 is a plan view illustrating a multiple-chamber medical container that represents one example of a medical container of the present invention.

The medical container is not limited to configurations containing a single holding portion, and for example, as illustrated in FIG. 6, a multiple-chamber medical container 50 may be formed in which the holding portion 51 is partitioned into a plurality of sections by a partitioning seal 52 that can be used to interconnect the plurality of section and a plurality of medical liquids can then be held separately in the respective sections.

In the multiple-chamber medical container 50 illustrated in FIG. 6, the partitioning seal 52 is formed so as to extend widthwise across the bag-like holding portion 51, thereby dividing the holding portion 51 into a first holding section 51a and a second holding section 51b. When the multiple-chamber medical container 50 is used, the partitioning seal 52 can be broken by the user applying external pressure to either the first holding section 51a or the second holding section 51b, thus enabling mixing of the medical liquid inside the first holding section 51a and the medical liquid inside the second holding section 51b.

There are no particular limitations on the method used for forming the partitioning seal 52, and for example in those cases where heat sealing is performed during the formation of the holding portion 51, the partitioning seal 52 may be formed at the same time by heat sealing. Further, the partitioning seal 52 may also be formed in a separate step using a conventional sealing method other than heat sealing, such as impulse sealing. Moreover, in those cases where the holding portion 51 is produced by blow molding, a body that forms the partitioning seal 52 may be provided within the molding die used during blow molding, so that the partitioning seal 52 can be formed at the same time as the blow molding.

Moreover, although not illustrated in the drawings, if necessary, the medical container of the present invention may include a light-shielding layer for protecting the medical liquid, with this light-shielding layer being provided on the outside of the container, and particularly on the outside of the holding portion. Examples of materials that can be used favorably as this light-shielding layer include metal foils such as aluminum foil, aluminum vapor deposition films, laminated films composed of a metal foil and a synthetic resin film, and synthetic resin films containing a pigment. Of these light-shielding layers, an aluminum foil or aluminum vapor deposition film exhibits not only favorable light-shielding properties, but also has favorable moisture-proofing, oil resistance and water absorption resistance properties, and is therefore preferable in terms of enhancing the long-term storage properties of the medical liquid contained inside the medical container. Further, this light-shielding layer may be provided in such a manner that enables the layer to be peeled away from the medical container, meaning the medical liquid can still be viewed from externally during use of the medical container.

In the preceding description, a medical liquid was used as an example of the medication contained inside the medical container of the present invention, but a medication that is not a medical liquid, but is rather formed from a powder formulation such as an antibiotic, may also be used. Furthermore, specific examples of the medical liquid include medical liquids used as injectable solutions such as contrast agents, antimicrobial agents, physiological saline solutions and circulatory system medications, although this is not limited thereto.

EXAMPLES

A more detailed description of the present invention is presented below based on a series of examples, although the present invention is in no way limited by the examples described below.

Example 1

A medical container 20 illustrated in FIG. 2 and filled with 100 ml of water was produced in the manner described below.

First, a multilayer blow molding method using a multilayer blow molding apparatus was used to integrally mold a holding portion 21 and a port section 22 from a blow-molded body with a three-layered structure containing an innermost layer of thickness 30 μm, an intermediate layer of thickness 250 μm, and an outermost layer of thickness 20 μm laminated in this order. Subsequently, the inside of the holding portion 21 was filled with 100 ml of water via the port section 22, and a rubber plug 22a was then heat sealed within the port section 22 to seal the medical container 20. The rubber plug 22a was prepared by using an injection molding method to provide a layer composed of a cyclic polyolefin "ZEONEX" (manufactured by Zeon Corporation) (hereafter referred to as "COP1") having a melt flow rate (hereafter abbreviated as "MFR", wherein the loading during MFR measurements was 21.18 N in all of the examples and comparative examples) determined at 280° C. in accordance with ISO 1133 of 17 g/10 min, and a glass transition temperature of 136° C. around the outer periphery of a rubber plug.

For the innermost layer, a cyclic polyolefin mixture containing COP1 and a cyclic polyolefin "ZEONOR 1020R" (manufactured by Zeon Corporation) (hereafter referred to as "COP2") having an MFR determined at 280° C. in accordance with ISO 1133 of 20 g/10 min, and a glass transition temperature of 102° C. blended in a weight ratio of 1:1 was used. Only a single Tg was observed for this mixed cyclic polyolefin, and the Tg was 119° C.

For the intermediate layer, a mixture containing "HARMOREX" (manufactured by Japan Polyethylene Corporation), which is an LLDPE produced using a single-site catalyst (hereafter also referred to as a "single-site LLDPE") and having an MFR at 190° C. of 1 g/10 min and a density of 0.906 g/cm$^3$, and "NOVATEC" (manufactured by Japan Polyethylene Corporation), which is an HDPE having an MFR at 190° C. of 3.5 g/10 min and a density of 0.956 g/cm$^3$, blended in a weight ratio of 8:2 was used.

For the outermost layer, the HDPE "NOVATEC" (manufactured by Japan Polyethylene Corporation) having an MFR at 190° C. of 3.5 g/10 min and a density of 0.955 g/cm$^3$ was used.

The water-filled medical container 20 of FIG. 2 obtained in this manner was subjected to a high-pressure steam sterilization for 30 minutes at 121° C. using a spray-type high-pressure steam sterilizer, and the properties of the container before and after the sterilization were evaluated using the methods described below. The results of the evaluations are shown below in the tables.

In the examples and comparative examples, evaluations of the blocking resistance and the molding stability were only performed in those cases where a film was molded to form the holding portion, and were not performed in examples such as example 1 where the holding portion was formed by multilayer blow molding.

(Evaluation Methods)

(1) Blocking Resistance

Two multilayered bodies of dimensions 10 cm×10 cm were superimposed so that the outermost layers of the two bodies made contact, a loading of 98 N/100 cm$^2$ was applied, and the bodies were held in this state for 24 hours at 60° C. Subsequently, the bodies were cooled to room temperature, and following removal of the loading, the two films were peeled apart. The ease of this peeling was evaluated using the two levels listed below.

○: peeling occurred easily x: there was resistance to peeling (2) Peel Strength

Figure 7A:
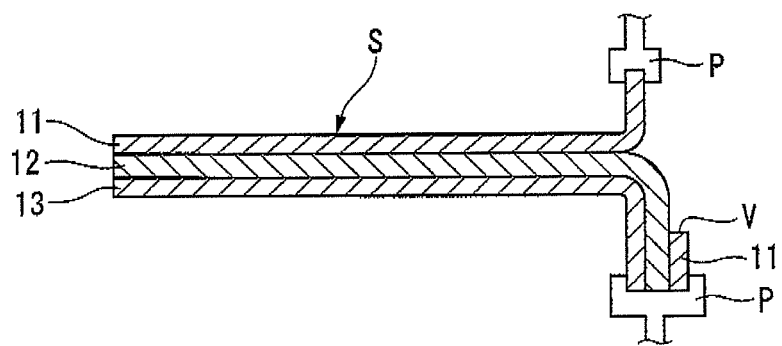
FIG. 7(A) is a schematic illustration describing a peel test used in the examples.

Strip samples S of width 15 mm were cut from the medical container before and after the high-pressure steam sterilization, and as illustrated schematically in FIG. 7(A), the T-peel strength between the innermost layer 11 and the intermediate layer 12 was measured in accordance with JIS K 6854-3 at a tensile speed of 300 min/min. This test was conducted using a tensile tester. In the figure, the symbols P represent the chucks of the tensile tester.

Figure 7B:
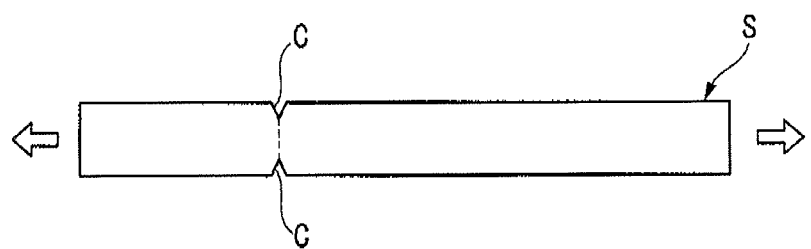
FIG. 7(B) is a plan view describing a method of preparing a sample for use within FIG. 7(A).

In order to achieve the state illustrated in FIG. 7(A), where only the innermost layer 11 of the sample S has been ruptured at the rupture portion V, first, as illustrated in the plan view of FIG. 7(B), notches C are inserted in two opposing positions on the widthwise edges of the sample S cut from the medical container, and the sample S is then pulled in the lengthwise direction, as indicated by the arrows shown in FIG. 7(B). This pulling enables a sample to be obtained in which only the innermost layer 11 has been completely ruptured at the position of the notches C, while the other layers remain intact. Accordingly, by subsequently setting the sample in the tensile tester as illustrated in FIG. 7(A), the peel strength at the interface between the innermost layer 11 and the intermediate layer 12 can be measured.

(3) Transparency

The haze before and after the high-pressure steam sterilization was measured in accordance with JIS K 7136.

(4) Heat Resistance

The medical container was mounted on a punched metal tray having circular holes formed therein and subjected to high-pressure steam sterilization using a spray-type high-pressure steam sterilizer, and the external appearance of the medical container was then evaluated visually.

○: no deformation or shrinkage was observed following sterilization.

Δ: slight deformation and/or shrinkage such as surface roughness was observed.

x: deformation and/or shrinkage was significant, and impressions from the circular holes in the tray were formed in the container.

(5) Molding Stability

The shape stability of a tube-shaped film during inflation molding, and the level of occurrence of wrinkles in the film were evaluated.

○: the tube shape remained uniform, and no wrinkles were observed in the film.

x: the tube shape was unstable, and fluctuations occurred in the tube diameter. Wrinkles were observed in some portions of the film.

Example 2

A medical container 20 was prepared in the same manner as example 1, with the exceptions of altering the composition of the outermost layer and the configuration of the port section 22.

For the outermost layer, a mixture containing a high-pressure low-density polyethylene "NOVATEC" (manufactured by Japan Polyethylene Corporation) having an MFR at 190° C. of 1.1 g/10 min and a density of 0.927 g/cm$^3$, and a high-density polyethylene "NOVATEC" (manufactured by Japan Polyethylene Corporation) having an MFR at 190° C. of 3.5 g/10 min and a density of 0.956 g/cm$^3$ dry-blended in a weight ratio of 7:3 was used.

The port section 22 was produced by heating, in a preheated molding die set to a temperature of 250° C., a cylindrical member formed from a cyclic polyolefin produced by injection molding, subsequently inserting the cylindrical member inside the port section 22 of the holding portion 21 formed from the blow-molded body illustrated in FIG. 2, and then performing heat sealing at 220° C. Further, following filling of the container with 100 ml of water, a rubber plug was inserted in the cylindrical member, a ring-shaped lid member was positioned so as to clamp the periphery of the rubber plug, and the cylindrical member and the lid member were then subjected to ultrasonic welding. COP1 was used for the cylindrical member and the lid member. The container was then evaluated in the same manner as example 1. The results are shown in the tables.

Example 3

With the exception of using only COP2 in forming the innermost layer, a medical container 20 was obtained and then evaluated in the same manner as example 1. The results are shown in the tables.

In this example, for the rubber plug 22a, a plug prepared by using an injection molding method to provide a layer composed of the LLDPE used in the intermediate layer around the outer periphery of the rubber plug was used.

Example 4

With the exception of using only a single-site LLDPE "HARMOREX" (manufactured by Japan Polyethylene Corporation) having an MFR at 190° C. of 3.5 g/10 min and a density of 0.918 g/cm$^3$ during formation of the intermediate layer, a medical container 20 was obtained and then evaluated in the same manner as example 3. The results are shown in the tables.

In this example, for the rubber plug 22a, a plug prepared by using an injection molding method to provide a layer composed of the LLDPE used in the intermediate layer around the outer periphery of the rubber plug was used.

Example 5

With the exception of using only a single-site LLDPE "UMERIT" (manufactured by Ube Industries, Ltd.) having an MFR at 190° C. of 4.0 g/10 min and a density of 0.931 g/cm$^3$ during formation of the intermediate layer, a medical container 20 was obtained and then evaluated in the same manner as example 3. The results are shown in the tables.

In this example, for the rubber plug 22a, a plug prepared by using an injection molding method to provide a layer composed of the LLDPE used in the intermediate layer around the outer periphery of the rubber plug was used.

Example 6

With the exception of using, for forming the intermediate layer, a mixture containing a single-site LLDPE "UMERIT 0520F" (manufactured by Ube Industries, Ltd.) having an MFR at 190° C. of 2.0 g/10 min and a density of 0.904 g/cm$^3$, and a HDPE "NOVATEC" (manufactured by Japan Polyethylene Corporation) having an MFR at 190° C. of 3.5 g/10 min and a density of 0.956 g/cm$^3$ blended together in a weight ratio of 8:2, a medical container 20 was obtained and then evaluated in the same manner as example 1. The results are shown in the tables.

In this example, for the rubber plug 22a, a plug prepared by using an injection molding method to provide a layer composed of COP1 around the outer periphery of the rubber plug was used.

Example 7

A medical container 30 illustrated in FIG. 3 and filled with 100 ml of water was produced in the manner described below.

First, a multilayer inflation molding method using a multilayer inflation film molding apparatus was used to produce a three-layered inflation film composed of an innermost layer of thickness 10 μm, an intermediate layer of thickness 220 μm, and an outermost layer of thickness 20 μm laminated in this order.

Subsequently, a film segment obtained by cutting the inflation film was softened by radiation heating with a heater set to a temperature of 300° C., and the film segment was then molded in a vacuum molding device employing an ambient temperature molding die, thereby yielding the film molded article 10' illustrated in FIG. 4.

Two of these film molded articles 10' were then superimposed with the concave depressions facing each other, the peripheral portions of the two film molded articles were heat sealed, and a cylindrical member prepared by injection molding of a cyclic polyolefin was then heat sealed to form the port section 32.

Following filling of the holding portion 31 with 100 ml of water via the port section 32, a rubber plug 32b was inserted in the cylindrical member, a ring-shaped lid member 32c was then positioned so as to clamp the periphery of the rubber plug 32b, and the cylindrical member and the lid member 32c were then subjected to ultrasonic welding, as illustrated in FIG. 3(B). COP1 was used for the cylindrical member and the lid member 32c.

The innermost layer, the intermediate layer and the outermost layer were each produced using the same resins as those described in example 1.

The sealed medical container 30 was then evaluated. The results are shown in the tables.

Example 8

A medical container 40 illustrated in FIG. 5 and filled with 100 ml of water was produced in the manner described below.

First, an inflation film with a three-layered structure was produced in the same manner as example 7.

Subsequently, both end portions of this inflation film were heat sealed to form a bag, and a cylindrical member prepared by injection molding of COP2 was heat sealed at one end of the bag, thus forming a port section 42 at one end of the film bag-type holding portion 41.

Following filling of the holding portion 41 with 100 ml of water via the port section 42, a rubber plug 42a was inserted in the cylindrical member, a ring-shaped lid member 42b was positioned so as to clamp the periphery of the rubber plug 42a, and the cylindrical member and the lid member 42b were then subjected to ultrasonic welding. COP1 was used for the cylindrical member and the lid member 42b.

The sealed medical container 40 was then evaluated. The results are shown in the tables.

Example 9

With the exception of using, for the outermost layer, a mixture containing a high-pressure low-density polyethylene "NOVATEC" (manufactured by Japan Polyethylene Corporation) having an MFR at 190° C. of 1.1 g/10 min and a density of 0.927 g/cm$^3$, and a high-density polyethylene "NOVATEC" (manufactured by Japan Polyethylene Corporation) having an MFR at 190° C. of 3.5 g/10 min and a density of 0.956 g/cm$^3$ blended in a weight ratio of 7:3, a medical container 40 was obtained and then evaluated in the same manner as example 8. The results are shown in the tables.

Example 10

With the exception of using, for the outermost layer, a mixture containing a linear low-density polyethylene "NOVATEC" (manufactured by Japan Polyethylene Corporation) produced using a Ziegler catalyst and having an MFR at 190° C. of 2.0 g/10 min and a density of 0.936 g/cm3, and a high-density polyethylene "NOVATEC" (manufactured by Japan Polyethylene Corporation) having an MFR at 190° C. of 3.5 g/10 min and a density of 0.956 g/cm3 blended in a weight ratio of 7:3, a medical container 40 was obtained and then evaluated in the same manner as example 8. The results are shown in the tables.

Comparative Example 1

With the exception of altering the main component of the intermediate layer from the single-site LLDPE used in example 1 to an LLDPE (manufactured by Japan Polyethylene Corporation) produced using a Ziegler catalyst and having an MFR at 190° C. of 1.1 g/10 min and a density of 0.906 g/cm$^3$, a medical container was molded and then evaluated in the same manner as example 1. The results of the evaluations are shown in the tables.

Comparative Example 2

With the exception of using, for forming the intermediate layer, only an LLDPE "MORETEC" (manufactured by Prime Polymer Co., Ltd.) produced using a Ziegler catalyst and having an MFR at 190° C. of 2.0 g/10 min and a density of 0.920 g/cm$^3$, a medical container was molded and then evaluated in the same manner as example 1. The results of the evaluations are shown in the tables.

Comparative Example 3

With the exception of not forming the outermost layer, and simply employing a two-layered structure composed of the innermost layer and the intermediate layer, a medical container was molded and then evaluated in the same manner as example 1. The results of the evaluations are shown in the tables.

Comparative Example 4

With the exception of altering the material used in forming the outermost layer from the HDPE used in example 1 only to an LLDPE "MORETEC" (manufactured by Prime Polymer Co., Ltd.) produced using a Ziegler catalyst and having an MFR at 190° C. of 2.0 g/10 min and a density of 0.920 g/cm³, a medical container was molded and then evaluated in the same manner as example 1. The results of the evaluations are shown in the tables.

Comparative Example 5

With the exception of altering the material used in forming the outermost layer from the HDPE used in example 1 to an LLDPE "MORETEC" (manufactured by Prime Polymer Co., Ltd.) produced using a Ziegler catalyst and having an MFR at 190° C. of 2.0 g/10 min and a density of 0.920 g/cm⁵, a medical container was molded and then evaluated in the same manner as example 8. The results of the evaluations are shown in the tables.

TABLE 1

|  |  | Example 1 | Example 2 | Example 3 | Example 4 | Example 5 |
|---|---|---|---|---|---|---|
| Molding method |  | blow | blow | blow | blow | blow |
| Blocking resistance |  | — | — | — | — | — |
| Peel strength [N/15 mm] | Before high-pressure sterilization | 25 | 24 | 26 | 24 | 23 |
|  | After high-pressure sterilization | 26 | 25 | 26 | 12 | 10 |
| Transparency [%] | Before high-pressure sterilization | 25 | 22 | 27 | 24 | 27 |
|  | After high-pressure sterilization | 31 | 29 | 32 | 29 | 36 |
| Heat resistance |  | ○ | ○ | Δ slight tray impressions | ○ | ○ |
| Molding stability |  | — | — | — | — | — |

|  |  | Example 6 | Example 7 | Example 8 | Example 9 | Example 10 |
|---|---|---|---|---|---|---|
| Molding method |  | blow | vacuum molding | film | film | film |
| Blocking resistance |  | — | — | ○ | ○ | ○ |
| Peel strength [N/15 mm] | Before high-pressure sterilization | 25 | 25 | 25 | 24 | 25 |
|  | After high-pressure sterilization | 26 | 25 | 26 | 25 | 25 |
| Transparency [%] | Before high-pressure sterilization | 25 | 12 | 10 | 8 | 8 |
|  | After high-pressure sterilization | 31 | 16 | 14 | 12 | 11 |
| Heat resistance |  | ○ | ○ | ○ | ○ | ○ |
| Molding stability |  | — | x | x | ○ | ○ |

TABLE 2

|  |  | Comparative example 1 | Comparative example 2 | Comparative example 3 | Comparative example 4 | Comparative example 5 |
|---|---|---|---|---|---|---|
| Molding method |  | blow | blow | blow | blow | film |
| Blocking resistance |  | — | — | — | — | x |
| Peel strength [N/15 mm) | Before high-pressure sterilization | 25 | 20 | 25 | 26 | 26 |
|  | After high-pressure sterilization | 10 | 5 | 25 | 26 | 26 |
| Transparency [%] | Before high-pressure sterilization | 34 | 38 | 22 | 23 | 8 |
|  | After high-pressure sterilization | 42 | 50 | Large deformation Measurement impossible | Large deformation Measurement impossible | Large deformation Measurement impossible |
| Heat resistance |  | ○ | ○ | x tray impressions, large deformation | x | x |
| Molding stability |  | — | — | — | — | ○ |

In examples 1 to 3 and 6 to 10, where a single site LLDPE was used as the main component of the intermediate layer, and this LLDPE was used in combination with an HDPE, medical containers were obtained which not only exhibited excellent heat resistance, but for which any reductions in the peel strength and transparency caused by the high-pressure steam sterilization were suppressed. In contrast, in the case of the medical container obtained in comparative example 1, in which a Ziegler LLDPE was used in combination with an HOPE, the reductions in peel strength and transparency caused by the high-pressure steam sterilization were significant. Comparison of examples 4 and 5 in which only a single site LLDPE was used for the intermediate layer, and comparative example 2 in which only a Ziegler LLDPE was used for the intermediate layer, revealed a similar trend.

In comparative example 3, in which an outermost layer was not provided, not only did the high-pressure steam sterilization cause a large reduction in the transparency, but the heat resistance was also poor. Even in comparative examples 4 and 5, in which the outermost layer did not include an HDPE, similar trends to comparative example 3 were observed. In examples 9 and 10, in which a high-pressure low-density polyethylene was used in combination with an HDPE as the components for the outermost layer, the molding stability was superior to that observed for examples 7 and 8 in which the outermost layer contained only HDPE.

Moreover, the blocking resistance of the film in example 8 was favorable, whereas the blocking resistance in comparative example 5 was poor.

Industrial Applicability

The present invention is able to provide a multilayered body for medical containers, in which the innermost layer formed from a cyclic polyolefin exhibits favorable adhesion to another layer without using an adhesive, which exhibits excellent heat resistance, and which provides favorable blocking resistance when formed as a film, as well as providing a medical container formed from this multilayered body for medical containers, which suffers minimal deterioration in properties such as transparency and peel strength even when subjected to sterilization with high-pressure steam or the like. Accordingly, the present invention is very useful from an industrial perspective.

The invention claimed is:

1. A multilayered body for medical containers used in forming a medical container, comprising at least
    an innermost layer composed of a cyclic polyolefin,
    an intermediate layer which is formed adjacently to said innermost layer and comprises, as a main component, a linear low-density polyethylene produced using a single-site catalyst, and
    an outermost layer containing a high-density polyethylene, wherein said cyclic polyolefin is a hydrogenated product of a ring-opening polymer of a cyclic olefin monomer and the body has a total thickness within a range from 60 to 1,000 µm, and is composed of three layers consisting of said innermost layer having a thickness of 5 to 100 µm, said intermediate layer, and said outermost layer having a thickness of 5 to 100 µm.

2. The multilayered body for medical containers according to claim 1, wherein a density of said linear low-density polyethylene is not less than 0.860 g/cm$^3$ but less than 0.940 g/cm$^3$.

3. The multilayered body for medical containers according to claim 1, wherein a density of said high-density polyethylene is within a range from 0.940 to 0.970 g/cm$^3$.

4. The multilayered body for medical containers according to claim 1, wherein said outermost layer is a mixture of said high-density polyethylene and a high-pressure low-density polyethylene.

5. The multilayered body for medical containers according to claim 1, wherein said outermost layer is composed solely of said high-density polyethylene.

6. A medical container comprising a holding portion for holding a medical fluid, wherein at least said holding portion is formed from a multilayered body for medical containers according to claim 1.

7. The medical container according to claim 6, wherein said multilayered body for medical containers is a blow-molded body.

8. The medical container according to claim 6, wherein said multilayered body for medical containers is a film, and said holding portion is prepared by hot-plate molding of said film.

9. The medical container according to claim 6, wherein said multilayered body for medical containers is a film, and said holding portion is prepared by forming said film as a bag.

10. The multilayered body for medical containers according to claim 1, wherein said innermost layer consists of a cyclic polyolefin.

11. The multilayered body for medical containers according to claim 1, wherein the intermediate layer comprises a linear low-density polyethylene produced using a single-site catalyst in an amount of at least 50% by weight.

12. The multilayered body for medical containers according to claim 1, wherein the intermediate layer comprises a linear low-density polyethylene produced using a single-site catalyst in an amount of at least 65% by weight.

13. The multilayered body for medical containers according to claim 1, wherein said intermediate layer comprises said linear low-density polyethylene produced using a single-site catalyst in an amount of at least 80% by weight.

14. The multilayered body for medical containers according to claim 1, wherein said outermost layer comprises said high-density polyethylene in an amount of at least 70% by weight.

15. The multilayered body for medical containers according to claim 1, wherein the glass transition temperature of the cyclic polyolefin is within a range from 70 to 180° C.

16. The multilayered body for medical containers according to claim 1, wherein the glass transition temperature of the cyclic polyolefin is within a range from 100 to 140° C.

17. The multilayered body for medical containers according to claim 1, wherein a density of said linear low-density polyethylene is within a range from 0.900 to 0.917 g/cm$^3$.

18. The multilayered body for medical containers according to claim 1, wherein the intermediate layer further comprises a high-density polyethylene.

19. The multilayered body for medical containers according to claim 1, wherein the multilayered body consists of the innermost layer, the intermediate layer, and the outermost layer.

* * * * *